(12) United States Patent
Fukui

(10) Patent No.: US 9,640,823 B2
(45) Date of Patent: May 2, 2017

(54) MANUFACTURING METHOD OF MEMBRANE ELECTRODE ASSEMBLY

(75) Inventor: Ryuta Fukui, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 511 days.

(21) Appl. No.: 12/563,005

(22) Filed: Sep. 18, 2009

(65) Prior Publication Data
US 2010/0075188 A1    Mar. 25, 2010

(30) Foreign Application Priority Data

Sep. 22, 2008    (JP) .................................. 2008-242826

(51) Int. Cl.
| | | |
|---|---|---|
| H01M 8/10 | (2016.01) | |
| H01M 8/1004 | (2016.01) | |
| H01M 4/88 | (2006.01) | |

(52) U.S. Cl.
CPC ....... *H01M 8/1004* (2013.01); *H01M 4/8803* (2013.01); *H01M 4/8896* (2013.01); *Y02P 70/56* (2015.11)

(58) Field of Classification Search
USPC ................................................. 429/400–535
IPC ................................................. H01M 8/10,4/88
See application file for complete search history.

(56) References Cited

U.S. PATENT DOCUMENTS

| 5,761,793 | A * | 6/1998 | Bevers et al. ............... 29/623.5 |
| 6,998,149 | B2 * | 2/2006 | Kohler et al. ............... 427/115 |
| 7,118,796 | B2 * | 10/2006 | Schulz et al. ................. 428/166 |
| 2003/0082432 | A1 * | 5/2003 | Wilkinson et al. ............. 429/39 |
| 2004/0253504 | A1 * | 12/2004 | Mossman et al. ............. 429/38 |
| 2007/0077350 | A1 * | 4/2007 | Hohenthanner et al. ..... 427/115 |

FOREIGN PATENT DOCUMENTS

| JP | 2003-303599 | 10/2003 |
| JP | 2006-185762 | 7/2006 |
| JP | 2006-244930 | 9/2006 |
| JP | 2006-318816 | 11/2006 |

OTHER PUBLICATIONS

Japanese Notification of Reasons for Refusal dispatched by JPO on Mar. 12, 2013, in connection with Appl. No. 2008-242826, 2 pgs.
Translation of the Japanese Notification of Reasons for Refusal dispatched by JPO on Mar. 12, 2013, in connection with Appl. No. 2008-242826, 4 pgs.

* cited by examiner

*Primary Examiner* — Christopher Schatz
(74) *Attorney, Agent, or Firm* — Squire Patton Boggs (US) LLP

(57) ABSTRACT

The present invention provides a manufacturing method of a membrane electrode assembly which makes it possible to produce a polymer electrolyte fuel cell at a high level of productivity. According to the present invention, it is possible to make differences in characteristics between a first catalyst electrode 11A and a second catalyst electrode 11B, which are formed on the both surfaces of a polymer electrolyte membrane 3, without changing materials of the first and the second catalyst electrode 11A and 11B. In the present invention, the first and the second catalyst electrode 11A and 11B are adhered to the polymer electrolyte membrane 3 by sticking the first catalyst electrode 11A by a first roll press 7 followed by sticking the second catalyst electrode 11B by a second roll press 8.

9 Claims, 2 Drawing Sheets

MANUFACTURING METHOD OF MEMBRANE ELECTRODE ASSEMBLY

CROSS REFERENCE TO RELATED APPLICATION

This application is based on and claims the benefit of priority from the Japanese Patent Application number 2008-242826, filed on Sep. 22, 2008, the entire contents of which are incorporated herein by reference.

BACKGROUND OF THE INVENTION

Field of the Invention

The present invention relates to a manufacturing method of a membrane electrode assembly (MEA). More specifically, the present invention relates to a method for manufacturing an MEA which is used in a polymer electrolyte fuel cell (PEFC), and a method for joining catalyst electrodes to an electrolyte membrane in the PEFC.

Description of the Related Art

A fuel cell which utilizes hydrogen and oxygen produces only water as a by-product in principle and is attracting attention as a power generation system which (little harms the environment) is environmentally friendly. In recent years, polymer electrolyte fuel cells (PEFCs) are especially considered as a promising fuel cell for a vehicle power source, and a stationary and household power supply etc. since the PEFCs, which use a proton conductive polymer electrolyte as an electrolyte, can operate at a low temperature, and have a high density output as well as being capable of downsizing.

PEFCs generally have a structure in which many single cells are stacked. A single cell has a separator on the anode, an electrode on the anode, a proton conductive polymer electrolyte membrane, an electrode on the cathode and a separator on the cathode in this order. The electrodes on the anode and cathode include an electrode substrate and a catalyst electrode, respectively.

In general, a product obtained by joining the catalyst electrodes on the anode and cathode to the polymer electrolyte membrane 3 is referred to as a membrane electrode assembly (MEA).

In manufacturing the MEA, a hot press is generally applied as a means for joining the catalyst electrodes and the polymer electrolyte membrane. The hot press has an advantage that the joining process is performed by relatively simple equipment. Whereas the hot press may cause a decrease in production efficiency because it is necessary to separate the hot press process from the catalyst electrodes forming process since the catalyst electrodes forming process is generally a continuous process while the hot press requires a step-by-step treatment (pressing only a single plate at a time) in principle. In addition, the hot press also has a problem that it is hard to form an even catalyst electrode on the polymer electrolyte membrane since an in-plane unevenness in pressing pressure is easily generated. In an extreme case, the catalyst electrodes and the polymer electrolyte membrane may be destroyed if an extremely high pressure is applied on a certain point.

In order to solve these problems, roll press methods and lamination methods are often proposed as a method for joining the catalyst electrodes and the polymer electrolyte membrane.

For example, a method for transferring portions of a catalyst layer formed on a long substrate film of a transfer film onto both surfaces of a long polymer electrolyte membrane intermittently with a predetermined interval is described in Patent Document 1 below. In addition, a method for weakening an adhesion force between a support medium and an object formed on the support medium by heating, irradiating activation light, elongating the support medium and/or irradiating ultrasound so that the object can be smoothly transferred in the case where an MEA is manufactured by transferring and stacking gas catalyst layers, diffusion layers and gaskets formed on a support medium is described in Patent Document 2 below.

<Patent document 1> JP-A-2006-185762
<Patent document 2> JP-A-2003-303599

The performance of the catalyst electrode depends on factors such as the type of material used, the amount of the catalyst, the structure and volume of micro pores, the water affinity and repellency, and the thickness etc. These factors can be controlled by changing the type of material, composition ratio of the materials, and production conditions. A change in the material, however, involves a number of influences on various manufacturing process steps of the fuel cell and a tremendous time and effort would have to be spent to grasp the all influences.

Furthermore, it is necessary to form two catalyst electrodes having different structures on both sides of the polymer electrolyte membrane since the required characteristics for catalyst electrodes of an MEA on the anode differ from those on the cathode. Thus if the required characteristics for the catalyst electrodes on the anode and the cathode are obtained, for example, by selecting each material (or material composition), it is necessary either to arrange two types of equipment or to use the same equipment twice because ultimately two types of catalyst electrodes have to be made. In which ever case, a heavy burden relating to the production expense or the production takt time must be bore.

SUMMARY OF THE INVENTION

The present invention focuses on the problems of joining the catalyst electrodes to the polymer electrolyte membrane stated above concerning a conventional method for manufacturing an MEA of a PEFC. The present invention aims to join the catalyst electrodes to the polymer electrolyte membrane in a short time while making the anode and the cathode have the required characteristic differences so as to manufacture a PEFC which meets various needs and suits various applications at high production efficiency.

After investigations, the inventor found that the aim of the invention mentioned above can be achieved by joining the catalyst electrodes of the anode and the cathode one-by-one to the electrolyte membrane by a roll-press method.

A first aspect of the present invention is a method of manufacturing an MEA by transferring a first catalyst electrode formed on a surface of a first support medium to one surface of a polymer electrolyte membrane and a second catalyst electrode formed on a surface of a second support medium to the opposite surface of said polymer electrolyte membrane, and the method includes applying pressure with a first roll press to the first support medium and the polymer electrolyte membrane in their thickness direction so as to transfer the first catalyst electrode to the one surface of the polymer electrolyte membrane, as well as applying pressure with a second roll press to the second support medium and the polymer electrolyte membrane in their thickness direction so as to transfer the second catalyst electrode to the opposite surface of the polymer electrolyte membrane.

In addition, a second aspect of the present invention is the method according to the first aspect of the present invention, wherein each of the first roll press and the second roll press has two rollers respectively, the first support medium together with the polymer electrolyte membrane and in contact with the one surface thereof is arranged between two rollers of the first roll press when applying pressure with the first roll press, and the second support medium together with the polymer electrolyte membrane and in contact with the opposite surface thereof is arranged between two rollers of the second roll press when applying pressure with the second roll press.

In addition, a third aspect of the present invention is the method according to the first aspect of the present invention, wherein the first support medium and the first catalyst electrode together with the polymer electrolyte membrane, the second catalyst electrode and the second support medium are collectively and simultaneously pressed when applying pressure with the second roll press to the second support medium and the polymer electrolyte membrane.

In addition, a fourth aspect of the present invention is the method according to the first aspect of the present invention, wherein the process of applying the pressure with the first roll press to the first support medium and the polymer electrolyte membrane, and the process of applying the pressure with the second roll press to the second support medium and the polymer electrolyte membrane are performed in the same transport line.

In addition, a fifth aspect of the present invention is the method according to the first aspect of the present invention, wherein the pressure applied with the first roll press to the first support medium and the polymer electrolyte membrane is different from the pressure applied with the second roll press to the second support medium and the polymer electrolyte membrane.

In addition, a sixth aspect of the present invention is the method according to the first aspect of the present invention, wherein the first catalyst electrode and the polymer electrolyte membrane are heated when applying the pressure with the first roll press, the first catalyst electrode, the second catalyst electrodes and the polymer electrolyte membrane are heated when applying the pressure with the second roll press, and the heating temperature when applying the pressure with the first roll press differs from the heating temperature when applying the pressure with the second roll press.

In addition, a seventh aspect of the present invention is the method according to the first aspect of the present invention, wherein the roll material of the first roll press is not the same as the roll material of the second roll press.

In addition, a eighth aspect of the present invention is the method according to the first aspect of the present invention, wherein the first catalyst electrode is an anode catalyst electrode and the second catalyst electrode is a cathode catalyst electrode.

In addition, a ninth aspect of the present invention is an MEA which is manufactured by the method according to the first aspect of the present invention.

In addition, a tenth aspect of the present invention is a fuel cell including the MEA according to the ninth aspect of the present invention, a pair of electrode substrates, and a pair of separators, wherein the MEA is combined with and interposed between the pair of electrode substrates, the MEA combined with the pair of electrode substrates is further combined with and interposed between the pair of separators.

Catalyst electrodes having different characteristics are conventionally obtained by different processes employing different materials, different compositions, different catalyst amounts and/or different thickness etc. whereas in the present invention, it is possible to manufacture catalyst electrodes having different characteristics (such as anode catalyst electrode and cathode catalyst electrode) without using different types of materials. It is also possible in the present invention to make differences between the properties of the catalyst electrodes on both sides of the MEA by sticking the electrodes by roll presses using different roll materials, applying with different pressures, and heating at different temperatures. The properties of the catalyst electrodes herein include microstructures in the catalyst electrodes (size distribution profiles of micro pores etc.) and catalyst electrodes thicknesses. It is possible to improve the MEA performance and reduce costs by controlling the microstructures in the catalyst electrodes.

DESCRIPTION OF REFERENCE NUMERALS AND SIGNS

1: Separator on the anode.
1a: Reaction gas flow path.
2: Anode electrode.
21: Electrode substrate on the anode (or anode electrode substrate).
22: Catalyst electrode on the anode (or anode catalyst electrode).
3: Proton conductive polymer electrolyte membrane.
4: Cathode electrode.
41: Electrode substrate on the cathode (or cathode electrode substrate).
42: Catalyst electrode on the cathode (or cathode catalyst electrode).
5: Separator on the cathode. 5a: Reaction gas flow path.
6: Joining equipment.
7: First roll press (or pressure roll). 7A: Roller (or roll body). 7B: Roller (or roll body).
8: Second roll press (or pressure roll). 8A: Roller (or roll body). 8B: Roller (or roll body).
9: Carrier film substrate.
10: Peeling roll (or peeling roller).
11: Catalyst electrode. 11A: First catalyst electrode. 11B: Second catalyst electrode.
12: Support medium. 12A: First support medium. 12B: Second support medium.

DETAILED DESCRIPTION OF THE INVENTION

Figure 1:
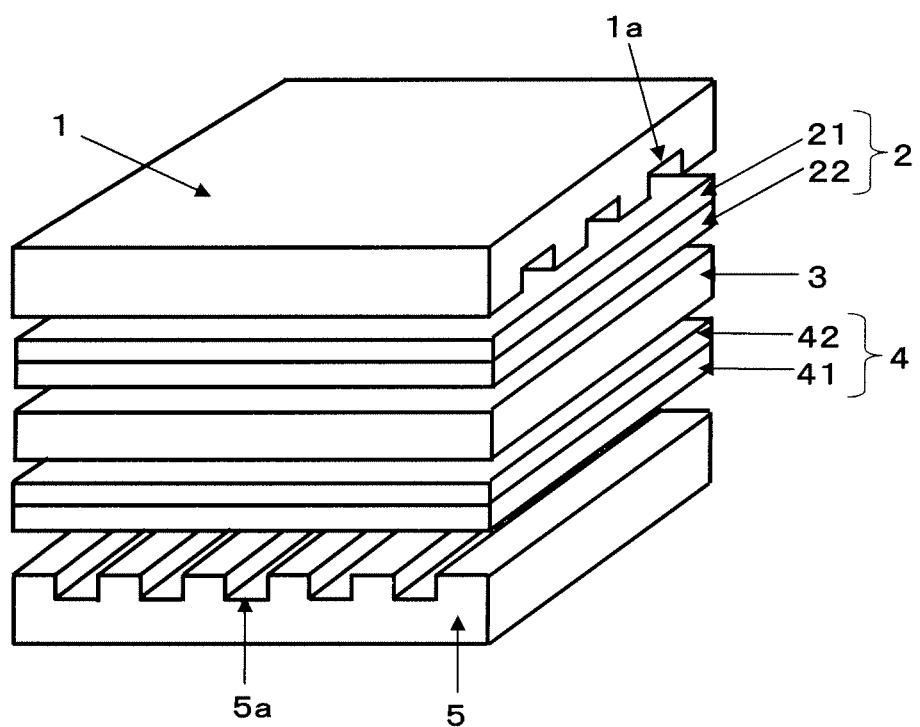
FIG. 1 is an exploded perspective view of a PEFC of the present invention.

FIG. 1 shows an exploded perspective view of a PEFC of the present invention. In general, PEFCs have a structure in which many single cells are stacked. A single cell has a separator on the anode 1, an electrode on the anode 2, a proton conductive electrolyte membrane 3, an electrode on the cathode 4 and a separator on the cathode 5 stacked in this order. The electrode on the anode 2 includes an electrode substrate 21 and a catalyst electrode 22, whereas the electrode on the cathode 4 includes an electrode substrate 41 and a catalyst electrode 42. Both the electrode substrate on the anode 21 and the electrode substrate on the cathode 41 are principally made of materials having a gas-diffusion property and electron conductivity, for example, carbon paper and carbon cloth etc. The separators 1 and 5 are made of conductive and impermeable materials (such as, for example, carbon and metal etc.) and are attached to reaction gas flow paths 1a and 5a. In addition, a cooling water flow paths may be arranged on the other sides of the reaction gas flow paths 1a and 5a. In addition, the catalyst electrodes on the anode 22 and on the cathode 42 are made in such a way that platinum catalysts are preliminarily loaded on the carbon particles and then the carbon particles are fixed on the electrode substrates 21 and 41 with a proton conductive polymer electrolyte.

An MEA is a product of joining the catalyst electrodes on the anode 22 and on the cathode 42 to the proton conductive polymer electrolyte 3.

The MEA, which is obtained by combining the polymer electrolyte membrane 3 together with the catalyst electrodes on the anode 22 and on the cathode 42, is interposed between a pair of the electrode substrates 21 and 41. And further arrangement of the resultant product, which is obtained by interposing the MEA into the electrode substrates 21 and 41, between a pair of the separators 1 and 5 provides a PEFC of the present invention.

Hydrogen-containing gas is supplied from the reaction gas flow path 1a arranged on the separator 1 on the anode while oxygen-containing gas is supplied from the reaction gas flow path 5a arranged on the separator 5 on the cathode. As these gases react as follows on the platinum catalysts in the catalyst electrodes, an electromotive force is generated between the anode and cathode.

Reaction at the anode (fuel electrode): $H_2 \rightarrow 2H^+ + 2e^-$

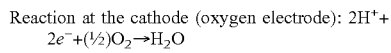

Reaction at the cathode (oxygen electrode): $2H^+ + 2e^- + (\frac{1}{2})O_2 \rightarrow H_2O$ These reactions take place while the fuel cell is generating electric power. Since these reactions are not the same as each other, different properties are required for the anode electrode and the cathode electrode. Because of the low reaction rate compared to the anode, the cathode requires a catalyst electrode with a higher catalyst activity. Regarding properties in relation to dealing with water, the catalyst electrode on the anode is required to have water retention characteristics whereas the catalyst electrode on the cathode is required to have water excretion characteristics. In this way, as it is necessary to design different types of catalyst electrodes between the anode and the cathode, a method for manufacturing an MEA having a first and a second catalyst electrode with different characteristics of the present invention is useful.

A manufacturing method of an MEA of the present invention is described in detail below.

Figure 2:
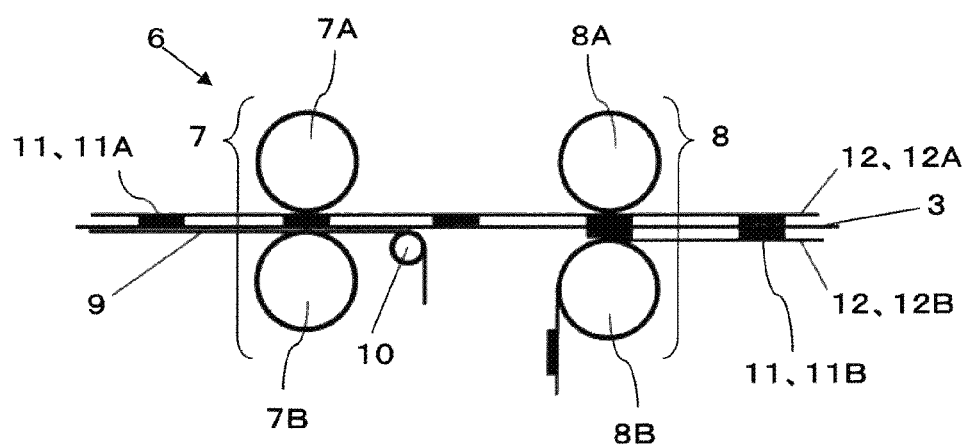
FIG. 2 is a schematic explanatory diagram illustrating a structure example of equipment which joins catalyst electrodes and a polymer electrolyte membrane employing a method of the present invention.

FIG. 2 is an explanatory schematic diagram showing a combining machine of the present invention which combines the catalyst electrodes with the polymer electrolyte membrane. The combining machine 6 includes a first roll press 7, a second roll press 8 and peeling roller 10. The first and second roll presses 7 and 8 are arranged within the same transport line, in which the first roll press 7 is at an upstream site (position) and the second roll press 8 is at a downstream site (position). The first roll press 7 has a pair of roll bodies 7A and 7B, which are biased in such a direction that the roll body peripheries get closer to each other while the axes of rotation of the roll bodies 7A and 7B are still kept parallel. Similarly, the first roll press 8 has a pair of roll bodies 8A and 8B, which are biased in such a direction that the roll body peripheries get closer to each other while the axes of rotation of the roll bodies 8A and 8B are still kept parallel. The peeling roll 10 is arranged at a site between the first roll press 7 and the second roll press 8 in the transport line.

In the present invention, MEAs are manufactured by transferring a first catalyst electrode 11A formed on a surface of a first support medium 12A to one surface of the polymer electrolyte membrane 3 and a second catalyst electrode 11B formed on a surface of a second support medium 12B to the other surface of the polymer electrolyte membrane 3, respectively. In the present invention, the MEAs can also be manufactured by a first roll press process in which a first catalyst electrode 11A is transferred to one surface of the polymer electrolyte membrane 3 by pressing a first support media 12A together with the polymer electrolyte membrane 3 by the first roll press 7, and a second roll press process in which a second catalyst electrode 11B is transferred to the other surface of the polymer electrolyte membrane 3 by pressing a second support media 12B together with the polymer electrolyte membrane 3 by the first roll press 8. In the first roll press process, the first support medium 12A is preliminarily arranged in such a way that the first catalyst electrode 11A slightly contacts the polymer electrolyte membrane 3 and then the pressing is performed with two rollers 7A and 7B of the first roll press 7, whereas in the second roll press process, the second support medium 12B is preliminarily arranged in such a way that the second catalyst electrode 11B slightly contacts the polymer electrolyte membrane 3 and then the pressing is performed with two rollers 8A and 8B of the second roll press 8. In the second roll press process, the support medium 12A, the first catalyst electrode 11A, the polymer electrolyte membrane 3, the second catalyst electrode 11B and the second support medium 12B are pressed all together.

In other words, the transport film substrate 9 on which the polymer electrolyte membrane 3 is formed and the catalyst electrode film on which the first catalyst electrode 11A is formed are faced together in such a way that the polymer electrolyte membrane 3 faces and contacts with the first catalyst electrode 11A (as is shown in FIG. 2, in which the first catalyst electrode 11A is arranged on the lower side of the first support medium 12A.), and subsequently passes between the rollers of the first roll press 7. As a result of this process, the first catalyst electrode 11A sticks to one surface of the polymer electrolyte membrane 3. Afterwards, in order to stick the second catalyst electrode 11B to the other surface of the polymer electrolyte membrane 3, the transport film substrate 9 is removed from the polymer electrolyte membrane 3 to a different direction from the transport line by a peeling roll 10 and wound on. Then, a catalyst electrode film which has the second catalyst electrode 11B on one surface of the second support medium 12B is wound off so as to arrange the second catalyst electrode 11B facing the opposite surface of the polymer electrolyte membrane 3 from the surface on which the first catalyst electrode 11A is formed (as is shown in FIG. 2, in which the second catalyst electrode 11B is arranged on the upper side of the second support medium 12B.) and passes between the rollers of the second roll press 8. As a result of this process, the second catalyst electrode 11B sticks to the other surface of the polymer electrolyte membrane 3 so that the MEA is obtained.

It is preferred that the polymer electrolyte membrane 3 is set on a transport film substrate 9. Because of the thickness, it is sometimes difficult to transport the polymer electrolyte membrane 3 without a transport film (the transport film substrate 9). Thus, the transport film substrate 9 is preferably used. The transport film is peeled and removed from the polymer electrolyte membrane 3 before the second catalyst electrode 11B is stuck to the polymer electrolyte membrane 3. For simplicity, hereinafter the first catalyst electrode 11A and the second catalyst electrode 11B are collectively referred to as a catalyst electrode 11, and the first support medium 12A and the second support medium 12B are collectively referred to as a support medium 12. Although a pattern of catalyst electrode 11 is formed on a support medium 12 in FIG. 2, the catalyst electrode 11 may be formed on the entire surface. In other words, although a plurality of catalyst electrodes 11 having a pattern with a sufficient size and an appropriate shape for an MEA are separately formed on the support medium 12 in FIG. 2, such a plurality of catalyst electrodes may also be formed on the entire support medium 12 with no separating space among them.

Next, the catalyst electrode 11 is described below. In order to form the catalyst electrode 11, a method, for example, in which a dispersion liquid dispersing a catalyst and a proton conductive polymer (a binder) with a dispersant is coated on the support medium 12 and dried, is employed. Solvents such as alcohol, ether and ketone etc. and a mixture of these with water etc. can be used as the dispersant. In particular, dispersants of mixtures of water and alcohols with carbon number ranging about 1-4 such as methanol, ethanol, propanol and butanol are desirable from the viewpoints of dispersing performance, solution stability, safety and costs. Various carbon materials on which metal particles such as platinum are loaded can be used as the catalyst material. Powers of a porous carbon such as carbon black, Vulcan carbon and ketjen black are preferable as the carbon materials. In addition, platinum and platinum alloy which includes ruthenium, iron, cobalt, palladium or nickel etc. can be used as the metal particles. Compounds represented by Nafion (by DuPont) in which the perfluorocarbon main chain is sulfonated are generally used as the proton conductive polymer (as the binder). In addition, for the purpose of improving the bonding force between catalysts and maintaining the microstructure of the catalyst electrode, polytetrafluoroethylene (PTFE) or polyvinylidene fluoride (PVdF) etc. may be added to the sulfonated perfluorocarbons.

A film of polyethylene terephthalate (PET), polyamide (Nylon), polyimide (PI), polyethylene naphthalate (PEN), polytetrafluoroethylene and ethylene-tetrafluoroethylene copolymer (ETFE) etc. can be used as the support medium 12 on which the catalyst electrode 11 is formed. Inexpensiveness (low cost), handleability, and ease of being peeled off (hereinafter called separatability) are required to the support medium 12 since the support medium 12 is supposed to be peeled off after the catalyst electrode 11 is stuck to the polymer electrolyte membrane 3. In this regards, easily procurable materials such as PET etc. are preferable as the support medium 12 in the case where the inexpensiveness and handleability are more important, whereas fluoropolymers such as polytetrafluoroethylene etc. are preferable in the case where the separatability is even more necessary. In addition, a material obtained by coating a separating material on a surface of PET etc. so as to improve the separatability can also be used as the support medium 12. In the present invention, the catalyst electrode which is formed first (the first catalyst electrode 11A) and the catalyst electrode which is formed next (the second catalyst electrode 11B) may have the same composition although it is not necessary for them to have the same composition. It is noted, however, that according to the manufacturing method of MEA of the present invention, it is possible to form two types of catalyst electrodes which have different characteristics but still have the same composition on both surfaces of the proton conductive polymer electrolyte membrane.

In addition, the electrode substrate also can be used as the support medium 12 on which the catalyst electrode 11 is formed. In this case, the support medium 12 is not peeled off after the catalyst electrode 11 is combined with the polymer electrolyte membrane 3 by a roll press.

Perfluorosulfonated polymer electrolyte membranes, for example, Nafion (a registered trademark of DuPont), GORE-SELECT (in Japan, a registered trademark of Japan Gore Tex KK), Flemion (a registered trademark of Asahi Glass Co., Ltd.), and Aciplex (a registered trademark of Asahi-Kasei Chemicals Corp.) can be used as the polymer electrolyte 3. Although a high level of proton conductivity, handleability and mechanical strength are all required for the proton electrolyte membrane 3, there is a trade-off relation between the proton conductivity and the mechanical strength as the mechanical strength is proportional to the membrane thickness while the proton conductivity varies inversely with the membrane thickness. As a result, considering all of these factors, it is preferred that the membrane has a thickness of about 50-100 μm. However, a thinner membrane which has a thickness, for example, 25-50 μm and is added with reinforcement such as polytetrafluoroethylene and ultrahigh molecular weight polyethylene (UHPE) etc. can also be used.

Temperatures, applying pressures and roll materials of the first roll press 7 and the second roll press 8 are preferred to be determined according to the characteristics required for the MEA. If the roll press is performed applying a low pressure at a low temperature, there is a possibility of failure that the catalyst electrode 11 is not stick to the electrolyte membrane 3 and thus the MEA can not be manufactured. Therefore, it is preferable that the adhesion (roll press) is performed by applying pressure of 1.5 MPa or more and at a temperature of 100° C. or more. It is more preferable that the adhesion (roll press) is performed by applying pressure of 2.0 MPa or more and at a temperature of 120° C. or more.

In practical power generation, the catalyst electrode on the anode needs to have a structure suitable for water retention and the catalyst electrode on the cathode needs to have a structure for easy drainage. Thus, it is necessary to form the anode catalyst electrode to have a relatively dense structure and the cathode catalyst electrode to have a porous structure. It is useful to obtain such an MEA by arranging the electrode 11A formed by the first roll press 7 as the anode catalyst electrode 22 as well as arranging the electrode 12B formed by the second roll press 8 as the cathode catalyst electrode 42. In addition, the preferable conditions of both roll presses 7 and 8 are, for example, applying pressures in the range of 1.5-3.5 MPa, temperatures in the range of 100-140° C., and the roll materials (of both the upper rolls and lower rolls) being a rubber with a shore hardness of around A70.

It is useful to adopt different applying pressures between both roll presses 7 and 8 (namely, to use not a common applying pressure but separately determined applying pressures between the first roll press 7 and the second roll press 8) in order to obtain two types of catalyst electrodes differing in characteristics. In such a case, it is preferable that the applying pressure by the first roll press 7 is larger than that by the second roll press 8.

It is useful to adopt different temperatures between both roll presses 7 and 8 in order to obtain two types of catalyst electrodes differing in characteristics. In other words, for the purpose of creating differences between the characteristics of the first catalyst electrode 11A and the second catalyst electrode 11B, it is useful to determine a temperature at which the first roll press 7 (together with the first catalyst electrode 11A and the polymer electrolyte membrane 3) is heated and a temperature at which the first roll press 8 (together with the first catalyst electrode 11A, the second catalyst electrode 11B and the polymer electrolyte membrane 3) is heated independently each other. In such a case, it is preferable that the temperature at which the first roll press 7 is heated is higher than the temperature at which the second roll press 8 is heated. Alternatively, it is also possible to provide the first catalyst electrode 11A (namely, only one of the electrodes) with preparatory heating, for example, by setting the temperature of the first roll press 7 to around 100° C. and the temperature of the second roll press 8 to around 130° C.

It is useful to adopt different types of materials between both roll presses 7 and 8 in order to obtain two types of catalyst electrodes differing in characteristics. For example, in the case where the roll material of the first roll press 7 is harder than that of the second roll press 8, two types of catalyst electrodes similar to those in the case where the applying pressure by the first roll press 7 is higher than the applying pressure by the second roll press 8 is obtained. Specifically, steel, stainless steel, aluminum and carbon fiber etc. can be employed as the material of the roll body 7A, 7B, 8A and 8B. In addition, surface treated rolls of these materials such as rolls coated with, for instance, alumina, zirconia, and silicon nitride etc., facially quenched iron-based rolls, and rolls plated or coated with hard chrome, nickel-chromium alloy, and nickel-silicon carbide etc. may also be used. Furthermore, rolls of the materials above covered with an elastic material such as chloroprene rubber (CR), butyl rubber (IIR: isobutyl isoprene rubber), acrylonitrile butadiene rubber (NBR), ethylene propylene rubber (EPDM: ethylene propylene diene methylene linkage), fluoro rubber (FPM), and silicone rubber (Q) may also be used as the roll body.

In the manufacturing method of an MEA of the present invention, it is preferable that the anode catalyst electrode 11 is formed first by the first roll press 7 and then the cathode catalyst electrode 11 is formed by the second roll press 8. In the manufacturing method of an MEA of the present invention, the first catalyst electrode 11A, which is formed first, receives both presses applied by the first roll press 7 and the second roll press 8 whereas the second catalyst electrode 11B, which is formed next, receives only a press applied by the second roll press 8. In the manufacturing method of an MEA of the present invention, it is possible to use different roll press conditions between the cathode catalyst electrode and the anode catalyst electrode since the catalyst electrodes 11 are formed by a plurality of steps. It is possible to make a dense structure in the catalyst electrode which is formed first because it receives a roll press twice. On the other hand, it is possible to make a relatively porous structure in the catalyst electrode which is formed subsequently because it receives a roll pressing only once. The manufacturing method of an MEA of the present invention helps to obtain a fuel cell and an MEA having a high level of power generation performance by arranging the first catalyst electrode 11A which is formed first as the anode catalyst electrode 22, which requires water retention properties, as well as arranging the second catalyst electrode 12A which is formed next as the cathode catalyst electrode 42, which requires drainage properties.

What is claimed is:

1. A method of manufacturing MEA by transferring a first catalyst electrode formed on a surface of a first support medium to one surface of a polymer electrolyte membrane and a second catalyst electrode formed on a surface of a second support medium to the opposite surface of said polymer electrolyte membrane, the method comprising:
    arranging a pattern of said first catalyst electrode formed on said surface of said first support medium and said polymer electrolyte membrane formed on a surface of a transport film substrate in such a way that said polymer electrolyte membrane faces and contacts said pattern of said first catalyst electrode;
    applying a first pressure with a first roll press, which has been heated to a first temperature, to said first support medium, on which said pattern of said first catalyst electrode is formed on said surface, and said transport film substrate, on which said polymer electrolyte membrane is formed on said surface, in their thickness direction so that said pattern of said first catalyst electrode sticks to said one surface of said polymer electrolyte membrane;
    removing said transport film substrate from said polymer electrolyte membrane by a peeling roll;
    arranging a pattern of said second catalyst electrode formed on said surface of said second support medium to face said opposite surface of said polymer electrolyte membrane from said one surface to which said pattern of said first catalyst electrode has stuck; and
    applying a second pressure with a second roll press, which has been heated to a second temperature, to said second support medium, on which said pattern of said second catalyst electrode is formed on said surface, and said polymer electrolyte membrane in their thickness direction so as to transfer said pattern of said second catalyst electrode to said opposite surface of said polymer electrolyte membrane, wherein
    said first catalyst electrode is an anode catalyst electrode and said second catalyst electrode is a cathode catalyst electrode, and wherein
    a condition that said first pressure is higher than said second pressure is satisfied; and
    said first catalyst electrode receives both presses applied by the first roll press and the second roll press whereas the second catalyst electrode receives only a press applied by the second roll press such that the entire first catalyst electrode forms a water retention structure from being processed through the first roll press and the second roll press and the second catalyst electrode forms a porous structure having drainage properties from being processed through only the second roll press.

2. The method according to claim 1, wherein
    each of said first roll press and said second roll press has two rollers respectively,
    said first support medium, together with said polymer electrolyte membrane and in contact with said one surface thereof, is arranged between two rollers of said first roll press when applying said first pressure with said first roll press, and
    said second support medium, together with said polymer electrolyte membrane and in contact with said opposite surface thereof, is arranged between two rollers of said second roll press when applying said second pressure with said second roll press.

3. The method according to claim 1, wherein
    said first support medium and said pattern of said first catalyst electrode, together with said polymer electrolyte membrane, said pattern of said second catalyst electrode and said second support medium, are collectively and simultaneously pressed when applying said second pressure with said second roll press to said second support medium and said polymer electrolyte membrane.

4. The method according to claim 1, wherein
the process of applying said first pressure with said first roll press to said first support medium and said polymer electrolyte membrane and the process of applying said second pressure with said second roll press to said second support medium and said polymer electrolyte membrane are performed in a same transport line.

5. The method according to claim 1, wherein
a roll material of said first roll press is not the same as a roll material of said second roll press.

6. The method according to claim 1, wherein
said transport film substrate is removed from said polymer electrolyte membrane to a different direction from a transport line by said peeling roll and then said transport film substrate is wound on.

7. The method according to claim 6, wherein
said second support medium is placed at a midstream site in the transport line and wound off after said transport film substrate is wound on and before arranging said pattern of said second catalyst electrode formed on said surface of said second support medium to face the opposite surface of said polymer electrolyte membrane from the surface to which said pattern of said first catalyst electrode has stuck.

8. The method according to claim 1, wherein
said first pressure and said second pressure are in the range of 1.5-3.5 MPa, and said first temperature and said second temperature are in the range of 100-140° C.

9. The method according to claim 1, wherein
roll materials of said first roll press and said second roll press are a rubber with a shore hardness of A70.

* * * * *